(12) United States Patent
Skoog (10) Patent No.: US 10,697,576 B1
(45) Date of Patent: Jun. 30, 2020

(54) HOSE RESTRAINT SYSTEM

(71) Applicant: Neil A. Skoog, Ostrander, OH (US)

(72) Inventor: Neil A. Skoog, Ostrander, OH (US)

( * ) Notice: Subject to any disclaimer, the term of this patent is extended or adjusted under 35 U.S.C. 154(b) by 798 days.

(21) Appl. No.: 15/400,335

(22) Filed: Jan. 6, 2017

Related U.S. Application Data

(60) Provisional application No. 62/291,234, filed on Feb. 4, 2016.

(51) Int. Cl.
*F16L 55/00* (2006.01)
*F16L 33/00* (2006.01)

(52) U.S. Cl.
CPC ............. *F16L 55/005* (2013.01); *F16L 33/00* (2013.01)

(58) Field of Classification Search
CPC .......... F16L 35/00; F16L 33/00; F16L 55/005
See application file for complete search history.

(56) References Cited

U.S. PATENT DOCUMENTS

| | | | | | |
|---|---|---|---|---|---|
| 4,428,211 | A | * | 1/1984 | Hermann | E05B 67/36 70/34 |
| 5,066,049 | A | * | 11/1991 | Staples | F16L 35/00 285/315 |
| 5,193,366 | A | * | 3/1993 | Brinkman | E05B 73/00 70/178 |
| 5,873,608 | A | * | 2/1999 | Tharp | F16L 55/005 285/114 |
| 2014/0306069 | A1 | * | 10/2014 | Robichaux | E21B 41/00 248/49 |

FOREIGN PATENT DOCUMENTS

GB    2439550 A  *  1/2008  ............ F16L 55/005

OTHER PUBLICATIONS

Dixon model KSW40 King safety whipsock hose restraint; http://dixoneurope.co.uk/pages/posts/new-whipsock-hose-restraint-131.php; Mar. 2015; and https://www.dixonvalve.com/product/KSW40.
Parker Hannifin Corp Hose Whip Restraint System; http://www.forconstructionpros.com/product/10083436/parker-hannifin-corp-hose-whip-restraint-system; obtained from client Sep. 2016.
O&P USA, Inc. Stopflex hose restraint model STOPFUSAE165; www.opusainc.com; Jan. 2015.
Whipchek Air hose restraint model WA2; http://www.americawestdrillingsupply.com/WhipChecks.asp and www.whipchek.com; obtained from client Sep. 2016.

* cited by examiner

*Primary Examiner* — Daniel J Wiley
(74) *Attorney, Agent, or Firm* — Ronald J. Koch; Claire J. Patton; The Eley Law Firm (57) ABSTRACT

A hose restraint system includes a base, a key, and a flexible connector. The flexible connector is secured at a proximal end to the key and at a distal end to a flexible hose. The key is configured to releasably engage the base. The base includes a sensor that provides a control signal to a control system indicating whether the key is in the locked position. The control system provides an operational interlock to prevent fluid flow in the flexible hose if the key is not in the locked position.

10 Claims, 8 Drawing Sheets

HOSE RESTRAINT SYSTEM

CROSS-REFERENCE TO RELATED APPLICATIONS

This application claims priority to U.S. provisional application 62/291,234, filed Feb. 4, 2016, the entire contents of which are hereby incorporated by reference.

FIELD

The present invention relates generally to a hose safety restraint system for securing flexible hoses. In particular, the present invention relates to a hose restraint system including a key secured by flexible connector to a flexible pipe, the key manually interlocked to a base, the base including a control to indicate that the key has been locked in the base.

BACKGROUND

Flexible conduit is commonly used to transfer various fluids, such as liquids, gases, or powdered solids, and such fluid flowing flexible conduits may be used in various applications to transmit power. Reinforced rubber or flexible metal hoses are commonly used in a variety of industries to transmit fluids at various flow rates and pressures in places where rigid piping is not practical due to movement between two devices. The flexible hose portion is commonly connected to a metal or plastic end to facilitate connection to stationary, rigid piping by crimping a fitted barbed end to the hose or by use of a series of clamps. In cases where the hose is frequently removed a quick disconnect type of connection is incorporated into the hose end so the operator does not need tools to make or break the connection.

In the event a failure of the flexible hose crimp or clamps, the force of the fluid will push the hose off the barbed end and cause the hose to whip and discharge the fluid in an uncontrolled manner. Hoses that have failed in this manner have been known to cause severe injury and even death in some cases. To reduce this danger, a simple safety restraint is commonly used. The simple safety restraint for such a hose consists of a flexible cable or chain connected at one end to the hose some distance from the coupling and at the other end to a fixed portion of a rigid structure. Current designs of the simple safety restraint require a bolt or screw of suitable strength to connect the restraint to the rigid structure. For applications that use the quick disconnects, this defeats the purpose of not requiring tools. If the operator fails to connect the simple piping restraint, they have compromised a critical safety feature.

One example application for a hose restraint is with hydraulic hoses utilized with diesel engine systems on an oil and gas drill rig. The drill rig consists of multiple modules. The diesel engine-hydraulic powerpack is one such module. The base structure, the mast structure, and the pipe loading structure are other modules that the diesel engine hydraulic powerpack needs to connect to. The multiple hydraulic hoses that connect between the diesel engine powerpack and the substructure & mast have quick disconnect ends to facilitate connection without needing tools and to reduce the "rig-up" and "rig-down" time.

Because of the size of some of the hydraulic hoses, a simple safety restraint of either cable or chain is typically used to provide an additional safety measure. Hoses typically fail at the connection of the metal fitting and the rubber hose. By connecting the safety restraint from a solid frame to the hose a short distance from the rubber-metal connection, should the hose fail, it will be limited in its tendency to straighten out or whip around and strike a bystander. The common method to connect the hose restraint to the solid frame is to bolt the restraint to the frame. This method defeats the purpose of using quick disconnect hose ends which don't require tools. There is a tendency for the operator to not connect the restraint rather than use the necessary tools. One additional concern is that the operator may forget to connect one of the multitudes of hoses that interconnect the structures. Failure to connect a return hose will possibly cause pressure to build up in a sensitive component and causing it to fail. An improperly connected quick disconnect can cause a hydraulic motor housing to fail and send parts of the housing flying past a service technician or other person standing nearby.

There remains a need for a flexible hose safety restraint system having a lock that can be secured without tools, the lock having a key manually interlocked with a base, the base having a sensor that provides a control signal to a control system indicating whether the key is in the locked position, and further where the control system provides an operational interlock to prevent fluid flow in the flexible hose if the key is not in the locked position.

SUMMARY

This invention includes a lock mechanism using a base and key for securing a flexible hose safety restraint without needing tools. The lock mechanism consists of a base that mounts securely to a stationary structure and a key that fits into the base and is retained by some method including but not limited to a ¼ turn latching mechanism. One end of a cable or chain is attached to the key. The other end of the cable or chain is attached to the flexible portion of a hose. The base includes a sensor in the form of a proximity sensor or mechanical switch that changes state when the key is properly inserted and locked to provide a control signal that is used to regulate flow control. The base sensor may also be a mechanical interlock that prevents a door, gate, machine or valve from being opened or operated if the key is absent or unlocked. Thus, a properly inserted and locked key controls the fluid flow system and physically restrains the hose in case of failure.

In one embodiment, a hose restraint system includes a base (aka lock enclosure), a key, and a flexible connector (aka safety restraint cable). The flexible connector is secured at a proximal end to the key and at a distal end to a flexible hose. The key is configured to releasably engage the base which serves to physically restrain the hose and provide a control signal indicative of a properly inserted and locked key.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numerals are used to refer to like structures and elements in the various figures.

Figure 1:
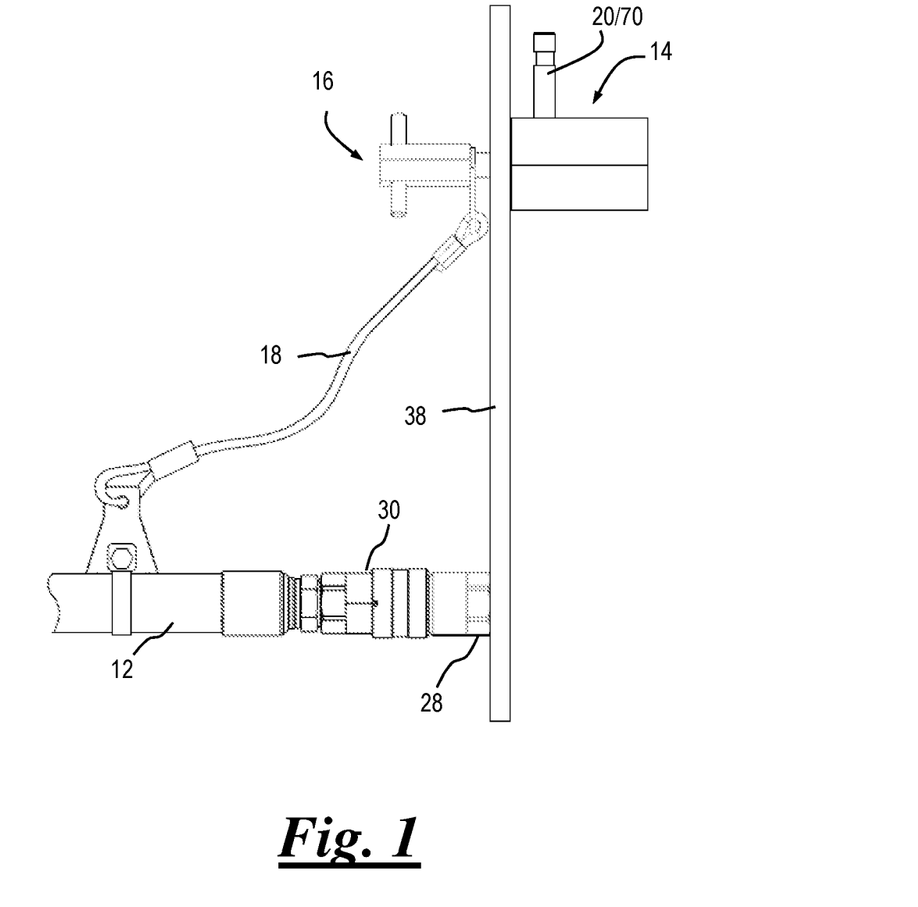
FIG. 1 is a side elevation view of a hose restraint system according to an embodiment of the present invention.

FIG. 1 indicates a typical installation for the assembled hose restraint system 10 providing safety for a flexible hose 12. Hose restraint system 10 includes a base (aka lock enclosure) 14, a key 16, a flexible connector (aka safety restraint cable) 18 and a control component 20 (aka control 20). Flexible connector 18 is secured at a proximal end 22 to key 16 and at a distal end 24 to flexible hose 12. Key 16 releasably engages base 14 to form lock 26.

Control component 20 is operable to provide a control signal indicative of the key in the locked position. The control signal is acted upon to regulate fluid flow through hose 12. For example, a position sensor is disposed to sense locking pin 42 of key 16 in a locked position and provides a control signal that is acted upon by a system controller 122 which prevents fluid flow unless the key is in the locked position.

Flexible hose 12 may be any flexible fluid conduit such as a reinforced rubber or flexible metal hose. The installation shows flexible hose 12 connected to a fixed, rigid piping 28 by a quick disconnect coupling 30. Distal end 24 of flexible connector 18 is secured to hose 12 via a clamp 32 located a short distance from quick disconnect coupling 30. Clamp 32 may be any suitable fastener configured to remain secured to flexible hose 12 in the event of a connection failure during fluid flow that dislodges the hose away from rigid piping 28. Clamp 32 may vary in type depending on the diameter and pressure associated with flexible hose 12. All components of hose restraint system 10 are configured to withstand the forces generated by flexible hose 12 during a connection failure event, such forces being proportional to the fluid type and pressure thereof.

Flexible connector 18 may be any suitable flexible connector, such as a chain or a woven metal cable, configured to secure flexible hose 12 during the connection failure event. Those of skill in the art will appreciate that the strength and rigidity characteristics of flexible connector 18, as well as the other components described herein, are commensurate with the fluid types and pressures encountered. Proximal end 22 of flexible connector 18 is secured to key 16 via a cable clip 34 using a crimped ferrule 36. The securing of flexible connector 18 to key 16 may be by any suitable fastener configured to withstand the connection failure event. Flexible connector 18 is made to be a predetermined length to provide a predetermined containment zone of allowable movement of flexible hose 12 during the connection failure event. Although shown as a single cable, flexible connector 18 may use a plurality of cables secured to flexible hose 12.

Base 14 is secured to any suitable fixed, rigid structure near quick disconnect coupling 30 (or other coupling for flexible hose 12 to rigid piping 28), such as structural supports for piping, equipment, or a bulkhead 38. Securing of base 14 may be by any suitable method, including, but not limited to welding or by fasteners, such as attaching with a jam nut (not shown) or series of bolts (not shown).

Figure 2:
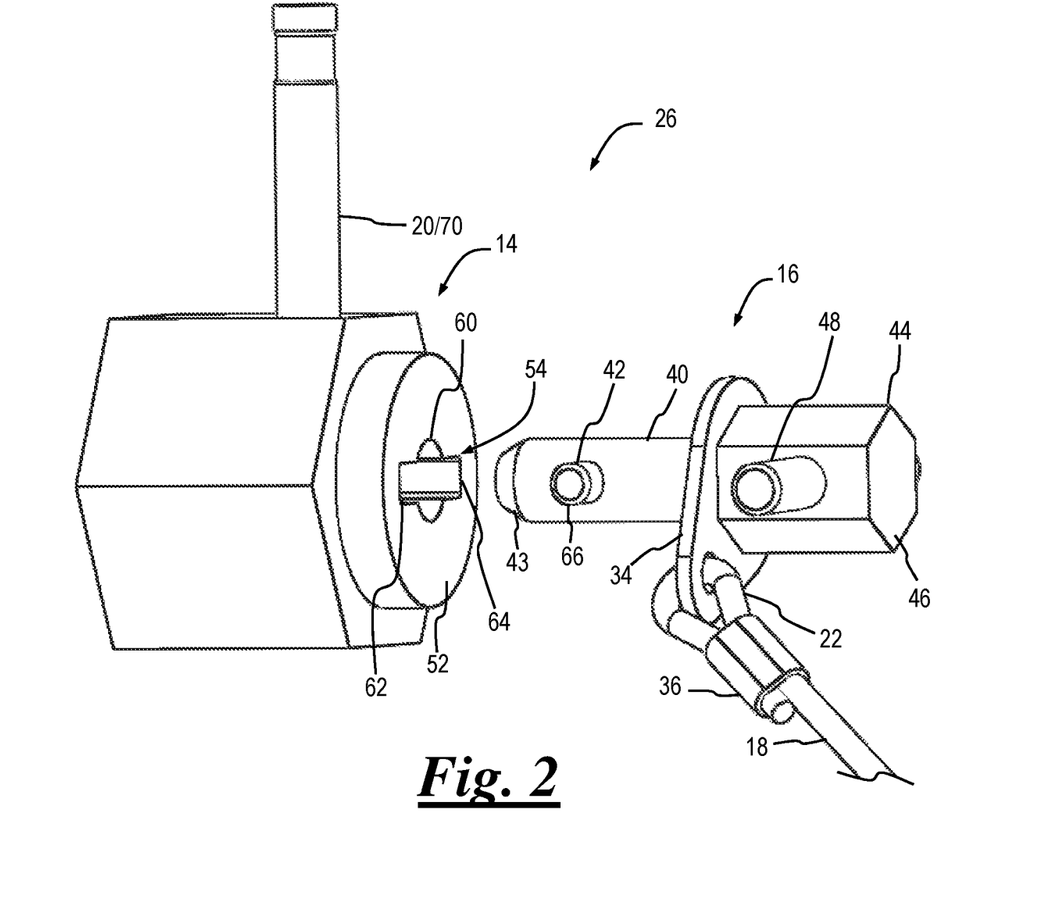
FIG. 2 is a side perspective view of the lock of FIG. 1 with the key shown removed from the base.
Figure 3:
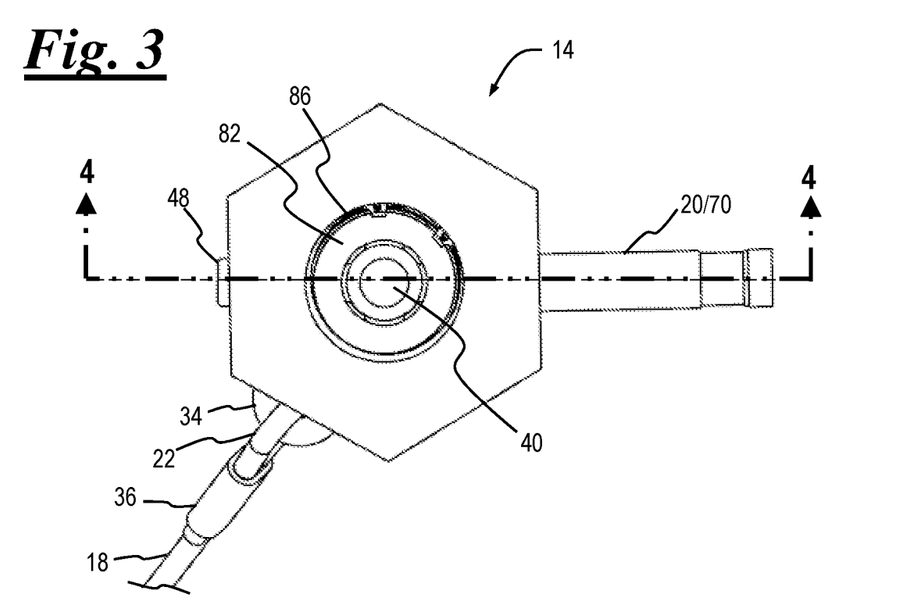
FIG. 3 is a bottom plan view of the lock of FIG. 1 (without cap 85)
Figure 4:
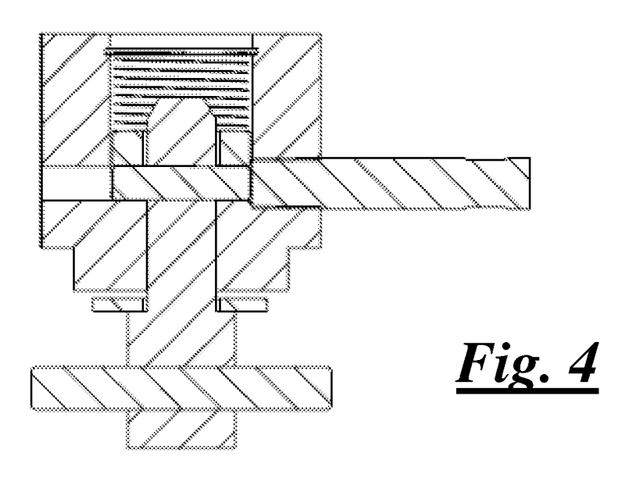
FIG. 4 is a sectional view taken along line 4 in FIG. 3.

FIG. 2 shows key 16 removed from base 14. For clarity, bulkhead 38 is not shown. Key 16 includes an elongate shaft 40 and a locking pin 42 transversally connected to the shaft adjacent to a distal end (aka first end) 43 of the shaft. Cable clip 34 is secured to shaft 40 of key 16 adjacent to locking pin 42. Cable clip 34 is configured to slide along the longitudinal axis of shaft 40 and to rotate about the shaft in order to allow movement for ease of connection of flexible connector 18 to flexible hose 12.

Figure 5:
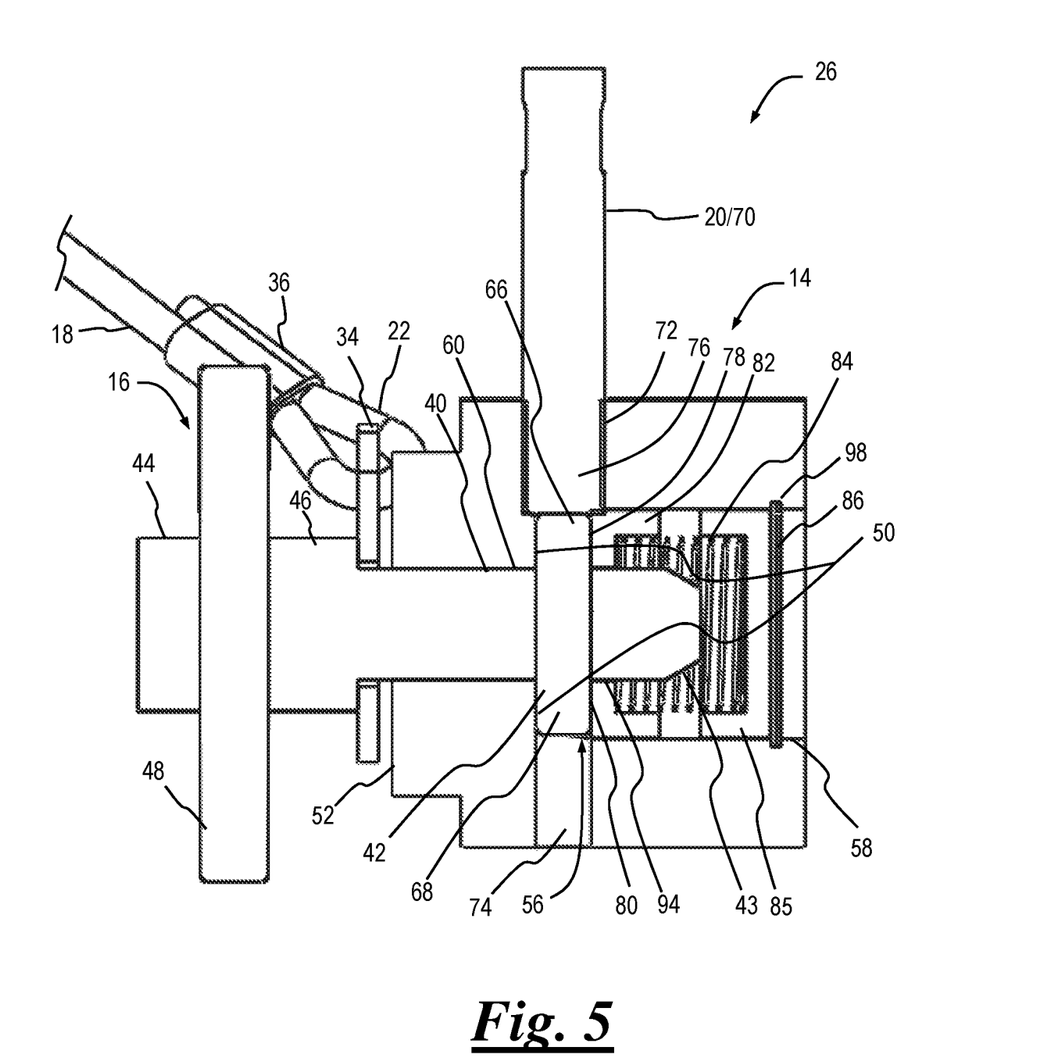
FIG. 5 is a view in section of the lock of FIG. 1, with the key in the locked position.

In one embodiment, handle 48 is transversally connected to proximal end (aka second end) 46 of shaft 40. Handle 48 is, for example, an elongated rod that is fitted within a hole through second end 46 of shaft 40. In one embodiment, second end 46 of shaft 40 has hexagonal portion 44. Hexagonal portion 44 is configured to allow key 16 to be turned with a standard wrench. This feature is advantageous, for example, during adverse weather conditions, such as freezing temperatures when the key is difficult to turn or is covered with ice. In one embodiment, handle 48 is transversally connected to hexagonal portion 44 and is configured to facilitate insertion and rotation of key 16 by an operator (preferably wearing gloves). The size and shape of key 16 is configured to permit operation with a gloved hand. Key 16 is manually inserted into slotted opening 54 of base 14 and then rotated from an open position to a locked position (locked position is shown in FIG. 5).

Base 14 includes an internal face 50 adjacent to an external face 52, and slotted opening 54 being disposed through internal face 50 and external face 52. Slotted opening 54 includes an upper bore 60, with a first slot 62 and an opposing second slot 64 extending outward from the upper bore. Upper bore 60 is preferably cylindrical, and is configured to receive shaft 40 of key 16.

Slotted opening 54 is configured to receive locking pin 42. First slot 62 is configured to receive a first arm 66 of locking pin 42, and second slot 64 is configured to receive a second arm 68 of locking pin 42. It should be noted that first and second arms 66, 68, and first and second slots 62, 64 are identical and may be referred to interchangeably.

Figure 9:
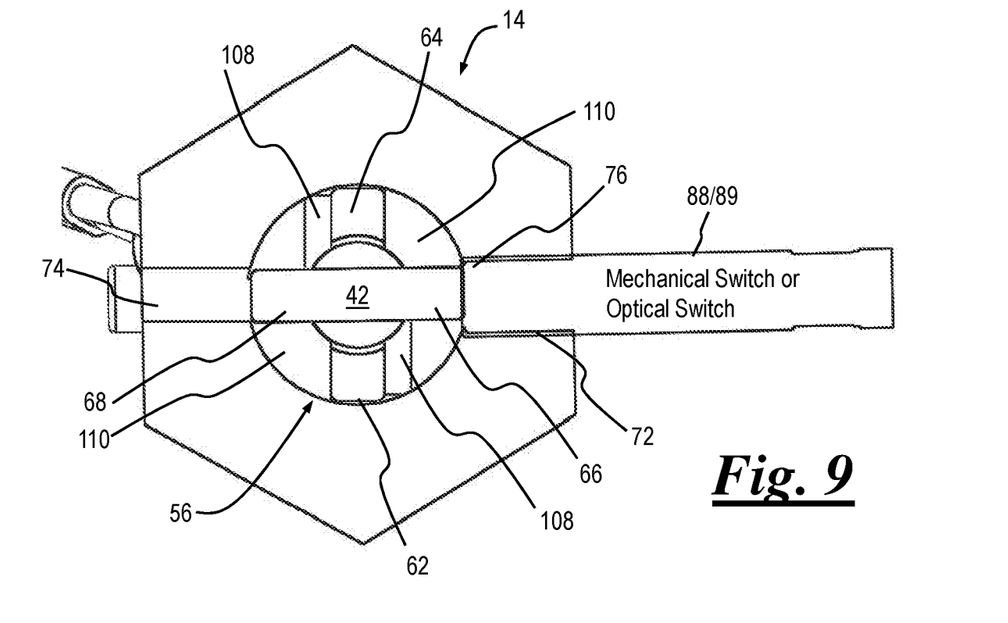
FIG. 9 is an end view in section of the engagement cavity of FIG. 3 shown with key in locked position (also shown: optional mechanical or optical switches)

Control component 20 may be any suitable device or system configured to detect and indicate the presence or absence of locking pin 42, such as position sensor 70. In one embodiment, position sensor 70 comprises a non-contact inductive style two-wire sensor configured to sense ferrous materials so as to indicate when locking pin 42 of key 16 is properly installed in the locked position (i.e. a portion of first and second arms 66, 68 are seated in first and second recess 78, 80). Other sensor types may include, without limitation, three wire conductive, capacitive, mechanical switches 88 or optical switches 89 (see FIG. 9) that sense and indicate the proximity of locking pin 42 of key 16.

In some embodiments, two sensors in base 14 may be used for control component 20, one to provide a signal and the other to indicate a lack of a signal when the locking pin 42 is detected. This backup control scheme increases the reliability and minimizes failures due to mechanical short circuits in the wiring.

In locations where use of electrical or electronic sensors/controls is dangerous or impractical, control component 20 may be a pneumatic sensor system or a small air pilot valve or hydraulic pilot valve that will provide a pressure or flow to a fluid control system.

A first recess 78 and an opposing second recess 80 are disposed in internal face 50, orthogonally to first and second slots 62, 64, and shaped to cooperatively fit a portion of locking pin 42 in a locked position.

Engagement cavity 56 includes a first port 72 and an opposing second port 74. First and second ports 72, 74 are each configured to receive a distal portion 76 of position sensor 70, even though only one of said ports might be used in a given embodiment.

First and second ports 72, 74 are each disposed substantially colinearly with first and second recesses 78, 80, such that locking pin 42, in the locked position, is substantially collinear with first and second ports 72, 74. Position sensor 70 (positioned in either first or second ports 72, 74) is calibrated to indicate a positive signal when locking pin is in the locked position.

In one embodiment, when locking pin 42 is disposed in the locked position, first recess 78 receives a portion of first arm 66 and second recess 80 receives a portion of second arm 68. As such, the operator can view the distal end of second arm 68 by looking through second port 74; visually confirming locking pin 42 is in the locked position. Further, when in the locked position, the distal end of first arm 66 is adjacent to the distal end of position sensor 70, allowing the position sensor to provide remote indication/confirmation that locking pin 42 is in the locked position. Although key 16 is shown as dual sided with two arms, key 16 may also be single sided with only a first arm 66, and base 14 configured to match and cooperate with a single-sided key.

Base 14 includes a spacer 82, a biasing member, such as spring 84, cap 85, and a retaining member, such as snap ring 86, all housed within lower bore 58. In one embodiment, spacer 82 and cap 85 are made from non-ferrous material. When assembled, spring 84 is in operative engagement with spacer 82 and cap 85, with the spacer and cap acting to align and guide the spring action. When key 16 is not inserted, spring 84 pushes top surface 90 of spacer 82 against internal face 50 such that perimeter edge 92 of spacer 82 is aligned with position sensor 70. Thus, position sensor 70 and/or control system 20 is indicative of a "key not present" state. As key 16 is inserted, distal end 43 of shaft 40 passes through aperture 94 spacer 82 and arms 66, 68 contact top surface 90 of spacer 82 as spring 84 is compressed.

In operation, hose restraint system 10 allows key 16 to be secured to base 14 without tools as the operator manually inserts the key into the base and rotates the key by a one quarter turn in a first direction (e.g. clockwise, as viewed from the top of base 14). Initially, the operator aligns shaft 40 with upper bore 60, aligns first arm 66 with first slot 62 and aligns second arm 68 with second slot 64, then moves/inserts distal end 43 of shaft 40 into slotted opening 54, whereby key 16 is in the open position. As key 16 and slotted opening 54 are symmetrical, key 16 may also be inserted in the 180 degrees opposite position. Once locking pin 42 has been moved into engagement cavity 56, key 16 is then in the inserted position.

Spring 84 provides an opposing force as the key is inserted by biasing spacer 82 against locking pin 42 as the locking pin is moved into engagement cavity 56. The biasing of spacer 82 insures smooth action during locking of locking pin 42. After the operator rotates key 16 by one quarter turn (about 90 degrees), the key is in the locked position, biased in the recess by spring 84.

Spacer 82 includes a central aperture 94 configured to receive distal end 43 of shaft 40 when key 16 is moved to the inserted and locked positions. Thus, shaft 40 acts to center spacer 82, which is configured to provide support by an opposing force to locking pin 42 as it is moved into the inserted position. Spacer 82 acts as a guide to urge first and second arms 66, 68 of locking pin 42 into first and second recesses 78, 80.

Spacer 82 receives the top portion of spring 84, and cap 85 receives the bottom portion of spring 84, retaining and guiding the spring within lower bore 58. Lower bore 58 includes an annular groove 98 proximate the exterior opening of the lower bore and configured to receive a portion of snap ring 86, securing the snap ring and providing support for cap 85 and the biasing action of spring 84. In some embodiments, cap 85 is configured to prevent debris or ice from entering lower bore 58 from the exterior.

Spring 84 maintains the biasing force of spacer 82 against locking pin 42, holding first and second arms 66, 68 securely in first and second recesses 78, 80 to prevent the locking pin from rotating out of the locked position (e.g. due to vibration).

The design and positioning of locking pin 42 and position sensor 70 are configured such that an operator could not easily defeat or bypass the system by installing a common bolt or other fastener in base 14 in place of key 16.

Figure 6:
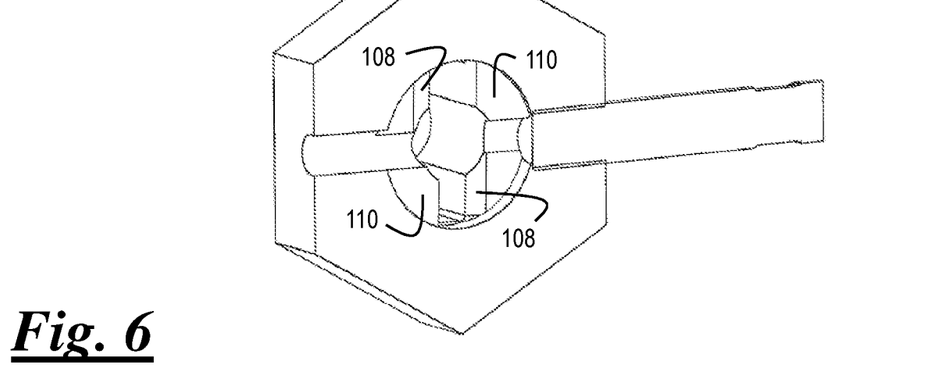
FIG. 6 is a perspective end view in section of the base of FIG. 2 taken through the engagement cavity.
Figure 7:
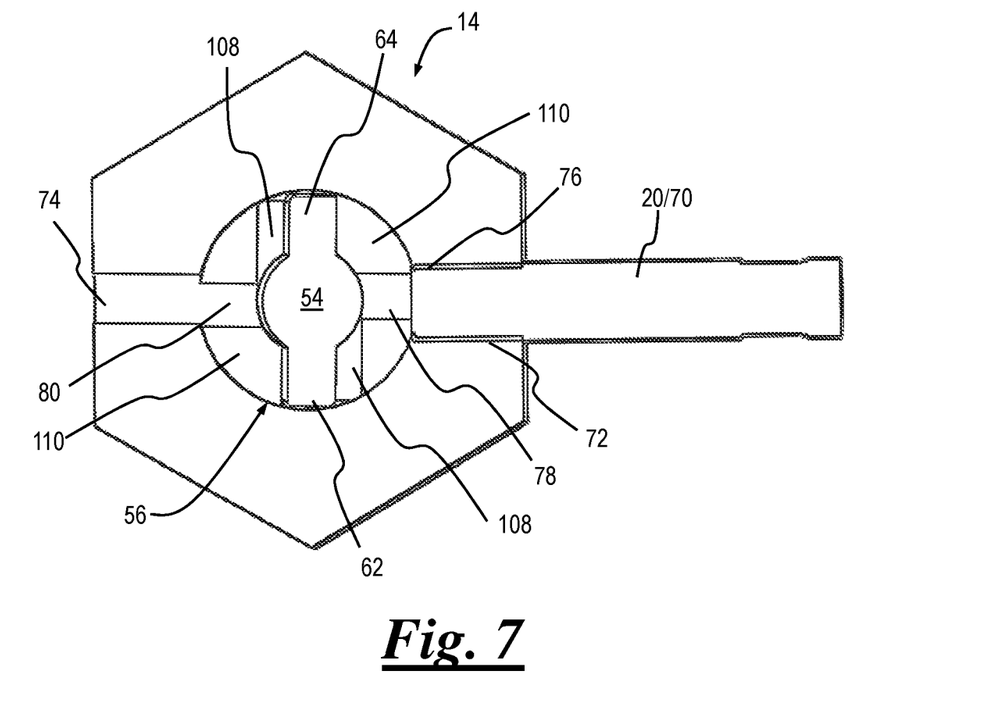
FIG. 7 is a slight perspective view of the section view of FIG. 6.
Figure 8:
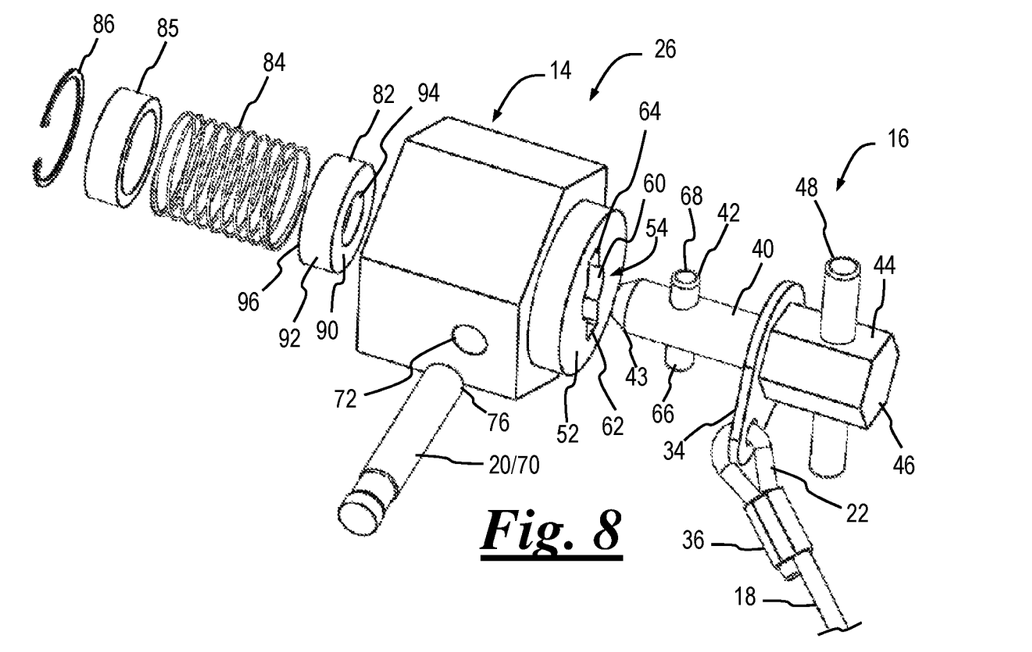
FIG. 8 is the lock of FIG. 2 shown with the base in exploded view.

Internal face 50 has first, second, third and fourth quadrants, 100, 102, 104 and 106, respectively. In one embodiment (e.g. FIGS. 6, 7), internal face 50 includes tapered portions 108 disposed in the first and/or third quadrant 100, 104, disposed intermediate first slot 62 and first recess 78, and/or second slot 64 and second recess 80. Tapered portion 108 is configured as a ramp or wedge to facilitate rotation of the key in a first direction, as locking pin 42 rotates into first and second recesses 78, 80. Tapered portion 108 is configured to provide the necessary detent depth to allow locking pin 42 to be retained in base 14 while not vibrating out during normal operation (by rotating back in a second direction, i.e., counterclockwise). Either one or two tapered portions can be used.

As noted above, spacer 82 biases locking pin 42 to prevent the locking pin from vibrating back down the ramp. When removing key 16 from base 14, the operator applies a slight downward force to overcome the bias of spring 84, and rotates key 16 a quarter turn in a second direction (i.e. counterclockwise), backing locking pin 42 back down the ramp to first and second slots 62, 42. Alternative suitable detent features may be used, such as spring loaded pins, to maintain locking arm 42 in the locked position. For stronger spring loads, tapered portions 108 become more important for ease of insertion.

In one embodiment (e.g. FIGS. 6, 7), internal face 50 includes stops 110 extending in the second and/or fourth quadrant 102, 106, disposed intermediate second slot 64 and first recess 78, and/or first slot 62 and second recess 80. Stop 110 is configured is to block locking pin 42 to prevent or restrain rotation of the locking pin in a second direction, or in the first direction beyond substantially 90 degrees. Thus, key 16 is prevented from rotating more than one quarter turn when moving into the locked position. Either one or two stops can be used. In such embodiments that incorporate both stop(s) 110 and tapered portion(s) 108, they must be cooperatively arranged (in alternating quadrants) so that a tapered portion facilitates rotation in one direction, while a stop prevents rotation in an opposite direction. Thus, a given quadrant would have either a stop or a tapered portion, but not both. In this spirit, it should therefore be appreciated that the designation of quadrant 1 is arbitrary, but the remaining quadrants must be numbered consecutively.

Figure 10:
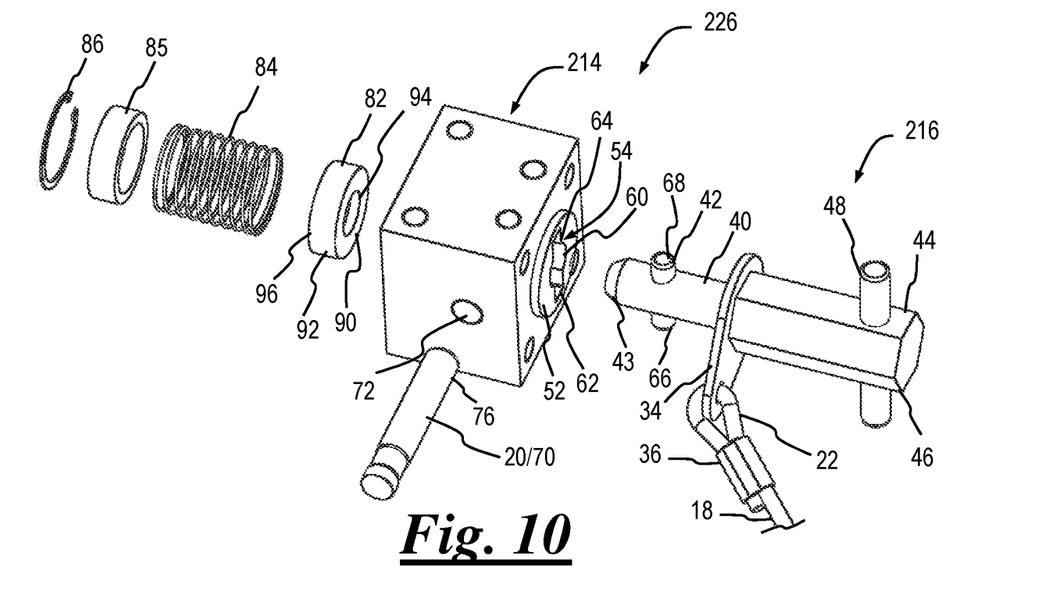
FIG. 10 is an exploded view of a base according to another embodiment of the present invention.
Figure 11:
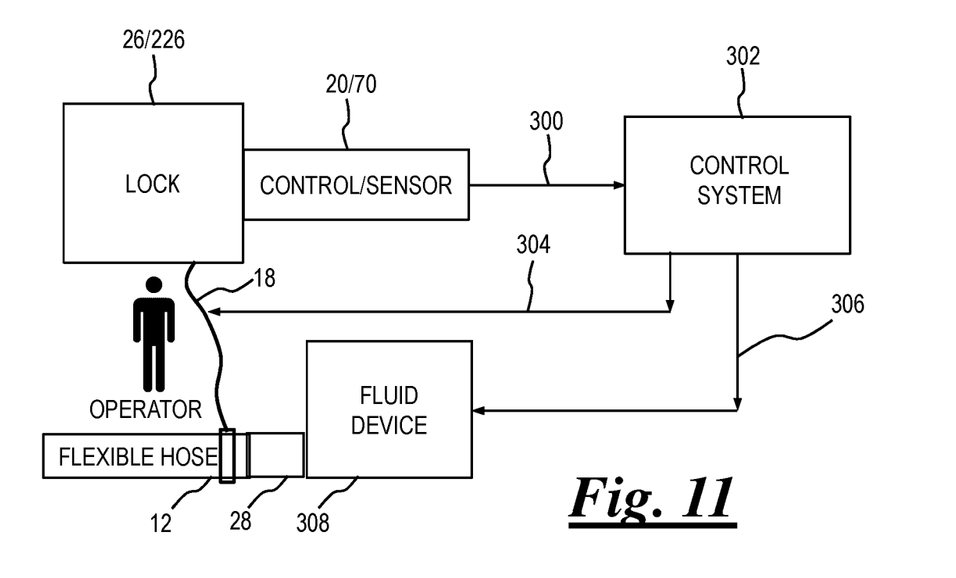
FIG. 11 is a schematic diagram of the controls for the hose restraint system.
Figure 12:
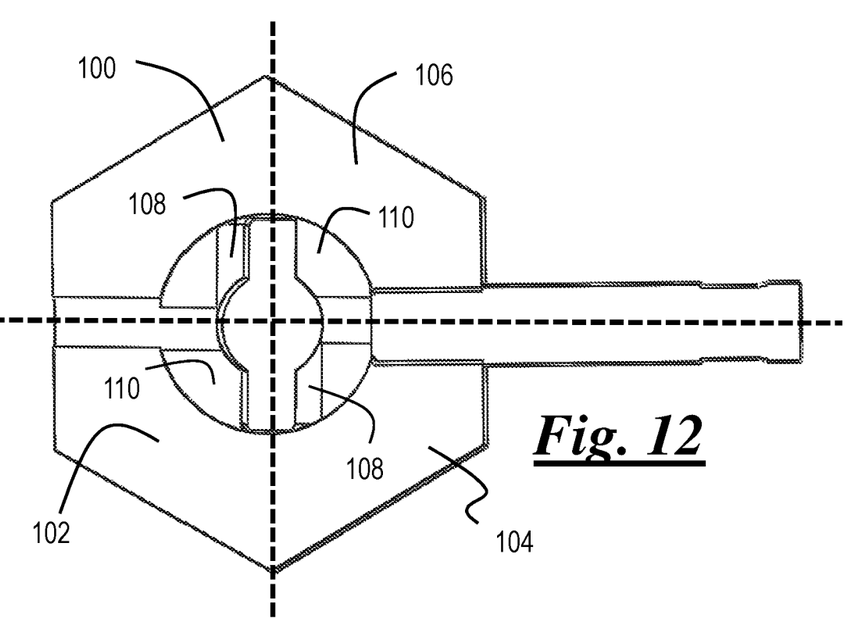
FIG. 12 depicts four quadrant orientation relative to FIG. 7.

Referring to FIG. 10, in an alternative embodiment, base 214 is rectangularly shaped. Key 216 is secured to a base 214 to form a lock 226. Referring to FIG. 11, when key 16 is properly installed in the locked position in base 14, position sensor 70 provides a control signal 300 to a control system 302. Control system 302 provides a status indication 304 to an operator, or automated system, that the connection of hose restraint system 10 has been properly made. Control system 302 may also provide an interlock or operating signal 306 to control activation of a fluid device 308.

Fluid device 308 may include various machines, such as engines, motors, or pumps, and/or control valves serving such machines. The presence of control signal 300 may be used to permit the machine to start or a valve to open, such that fluid flows through flexible hose 12. Lack of control signal 300 would either prevent the machine from starting, the valve from opening, or warn the operator that key 16 is not installed in the locked position inside base 14. For example, if locking pin 42 is detected by position sensor 70, a control signal 300 is sent to control system 302. Control system 302 provides a status indication 304 to the operator to confirm proper connection of the restraint and provides operating signal 306 to permit a fluid device 308, such as a diesel engine to start. If locking pin 42 is not detected, the lack of control signal 300 from position sensor 70 will prevent control system 302 from starting the diesel engine.

Alternatively, control signal 300 is automated to prevent, or cutoff, the flow of fluid through flexible hose 12 if key 16 is not in the locked position. In one embodiment, mechanical switch 88 (FIG. 9) may be substituted for the non-contact electrical proximity sensor, and a mechanical link (not shown) may be used to lock or unlock another device when key 16 is installed or removed. Alternatively, the pilot signals of a pneumatic control system may be used to operate larger valves that bypass and/or block the main fluid flow to flexible hose 12 to prevent damage and possibly prevent the corresponding machine from operating until the proper connections for hose restraint system 10 have been made.

In some embodiments, control system 302 would further provide an indication of the location and/or which sensor(s) lack the proper signal so the operator could easily confirm the proper hose connections(s). Some embodiments may include an additional safety feature to sense that flexible hose 12 is applying, or has applied, an excessive tension on flexible connector 18, or sense that flexible hose 12 is no longer in its installed position. This safety feature would then signal to indicate the presence or likelihood of a failed hose connection. As the operator is typically in a location where the flexible hose may not be visible, this signal could be used as a warning or shutdown if needed for safe operation and to minimize spilling of the fluid being conveyed.

For some hoses conveying flammable liquids, a static dissipation ground line is connected along with the hose. In such an application, the hose restraint system 10 may also serve as the static ground connection. Low level conduction sensors may be used to determine if the static connection was complete prior to control system 302 allowing the fluid transfer to begin.

Similar interlock control mechanisms may be installed for cages or guards that prevent the operator from being in the area near flexible hoses 12 when status 304 indicates that key is not installed in the locking position. Alternatively, where increased mobility on a drill rig or other application is needed, warning lights or sounds may be activated by control system 302 in the proximity of flexible hoses 12.

Figure 13:
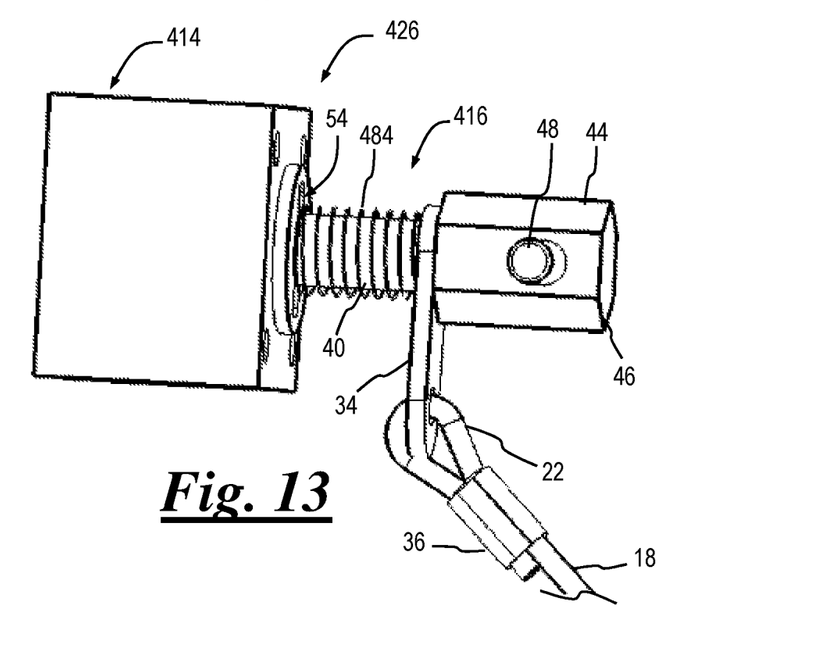
FIG. 13 is a side perspective view of a lock showing a key inserted in the slotted opening according to another embodiment of the present invention.

Referring to FIG. 13, in an alternative embodiment, base 414 is similar to base 214, but spacer 82, spring 84, cap 85 and snap ring 86 are optionally included. Key 416 is secured to base 414 to form a lock 426. Key 416 includes an external spring 484 disposed on shaft 40 adjacent to locking pin 42. External spring 484 is configured to assist in biasing key 416 to maintain locking pin 42 in the locked position. In addition, when locking pin 42 is in the locked position, external spring 484 biases cable clip 34 against hexagonal end 44 to prevent the cable clip from rotation about shaft 40 due to excessive vibration. Maintaining cable clip 34 in a stationary position relative to shaft 40 reduces wear on the cable clip.

Key 16 is made heavy duty and robust to withstand the abuse of being dragged across the ground as the hoses are removed from the connections and moved to a storage location. In some embodiments, a quick disconnect feature may be incorporated with flexible connector 18 to allow it to be removed quickly from a damaged flexible hose, and reinstalled quickly on a replacement hose. The profile of key 16 may also be designed in various differentiations to prevent mixing connections of keys and bases for different locations. This key differentiation could be used as a method to prevent a machine from operating if similar hoses were incorrectly connected at the wrong location. Using various colors for hose restraint systems 10 may also provide a quick indication of where similar hoses need to be connected.

Base 14 and key 16 are preferably made from zinc plated steel to minimize the effects of corrosion. Preferably, locking pin 42 is made of a ferrous material. Other materials such as brass, bronze, stainless steel, aluminum, or titanium alloys may be used for non-sparking, weight or cost saving reasons (with sensor selected accordingly). The size of the key and the base components have to be suitable to withstand the forces produced by the pressurized fluid or air in the event of hose failure. For different size hoses, the size of the components of hose restraint system 10 may be increased or decreased as appropriate to the application.

Other applications for hose restraint system 10 are test equipment for original equipment manufacturers (OEM) that perform production performance tests on new products installed. The connections to each new component and the test stand are made multiple times during the day. Another application is for delivery trucks that are loading or unloading materials. Some light weight, dry materials such as flour or grain can be conveyed using an air media. Often a static charge that could build up must be dissipated to prevent a potential spark that could ignite the fine dry particles.

While this invention has been shown and described with respect to a detailed embodiment thereof, it will be understood by those skilled in the art that changes in form and detail thereof may be made without departing from the scope of the claims of the invention.

What is claimed is:
1. A hose restraint system comprising:
 a flexible connector secured at a proximal end to a key and at a distal end to an end of a hose;
 the key being configured to releasably engage a lock enclosure;
 wherein the key further comprises: a shaft and a locking pin transversally connected to a first end of the shaft;

wherein the lock enclosure comprises:
> an internal face adjacent to an external face, a slotted opening disposed through the internal and external faces, and adapted to receive the locking pin,
> a recess disposed in the internal face, orthogonal to the slotted opening, and shaped to cooperatively fit a portion of the locking pin in a locked position, and
> a biasing member adapted to provide an opposing force to the locking pin as it is inserted through the slotted opening, and to urge the locking pin into the recess.

2. The hose restraint system of claim 1 further comprising: the opposing force comprises a spring in operative engagement with the biasing member.

3. The hose restraint system of claim 1 further comprising: the internal face having a tapered portion in a first and/or third quadrant, intermediate the slotted opening and the recess, for allowing rotation of the key in a first direction.

4. The hose restraint system of claim 1 further comprising: the internal face having a stop in a second and/or fourth quadrant, intermediate the slotted opening and the recess, for preventing rotation of the key in a second direction, and for restraining rotation of the key in the first direction beyond substantially 90 degrees.

5. The hose restraint system of claim 1 further comprising: a position sensor component disposed proximate the recess and adapted to provide a control signal indicative of the key in the locked position.

6. The hose restraint system of claim 5 further comprising:
> the locking pin being made of a ferrous material;
> the position sensor comprising a non-contact style proximity sensor for sensing ferrous materials;
> the spacer being made of a non-ferrous material.

7. The hose restraint system of claim 6 further comprising:
> the position sensor component comprising a mechanical switch.

8. The hose restraint system of claim 6 further comprising:
> the position sensor component comprising an optical switch.

9. The hose restraint system of claim 1 further comprising: a second end of the shaft having a hexagonal portion; whereby a wrench can engage the hexagonal portion and be used to turn the key.

10. The hose restraint system of claim 1 further comprising: a handle transversally connectable to the second end of the shaft; whereby the handle can be hand-held to turn the key.

* * * * *